(12) United States Patent
Hiramatsu et al.

(10) Patent No.: US 11,307,293 B2
(45) Date of Patent: Apr. 19, 2022

(54) RANGING SENSOR

(71) Applicant: SHARP KABUSHIKI KAISHA, Sakai (JP)

(72) Inventors: Takuma Hiramatsu, Sakai (JP); Takayuki Shimizu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 747 days.

(21) Appl. No.: 16/141,838

(22) Filed: Sep. 25, 2018

(65) Prior Publication Data

US 2019/0094342 A1 Mar. 28, 2019

(30) Foreign Application Priority Data

Sep. 25, 2017 (JP) .............. JP2017-184002

(51) Int. Cl.
| | |
|---|---|
| *G01S 7/48* | (2006.01) |
| *G01S 17/58* | (2006.01) |
| *G01S 7/481* | (2006.01) |
| *G01S 17/894* | (2020.01) |

(52) U.S. Cl.
CPC .......... *G01S 7/4808* (2013.01); *G01S 7/4815* (2013.01); *G01S 17/58* (2013.01); *G01S 17/894* (2020.01)

(58) Field of Classification Search
CPC .......... G01S 17/08; G01S 7/497; G01S 17/10; G01S 17/931; G01S 17/89; G01S 7/4863; G01S 17/88; G01S 7/4815; G01S 7/4817; H01L 31/02027; H01L 27/14643; H01L 25/167; G02B 26/10; G02B 27/30; G02B 3/0056; G02B 3/0068; G02B 26/08; G02B 26/105; B81B 5/00; G06K 9/00805; H01S 5/183; H01S 5/4075
See application file for complete search history.

(56) References Cited

U.S. PATENT DOCUMENTS

| | | |
|---|---|---|
| 2004/0091269 A1 | 5/2004 | Green et al. |
| 2005/0285966 A1 | 12/2005 | Bamji et al. |
| 2006/0244945 A1 | 11/2006 | Yamaguchi |
| 2007/0097349 A1 | 5/2007 | Wada et al. |
| 2018/0341009 A1* | 11/2018 | Niclass ................. G01S 7/4815 |
| 2019/0011556 A1* | 1/2019 | Pacala ................. G06K 9/00805 |
| 2019/0041519 A1* | 2/2019 | Spickermann .......... G01S 17/93 |

FOREIGN PATENT DOCUMENTS

| | | |
|---|---|---|
| CN | 1854682 A | 11/2006 |
| CN | 1991407 A | 7/2007 |
| JP | 11-166979 A | 6/1999 |
| JP | 2002-131450 A | 5/2002 |
| JP | 2004-503175 A | 1/2004 |
| JP | 2007-526453 A | 9/2007 |
| JP | 2010-091426 A | 4/2010 |
| JP | 2014-059301 A | 4/2014 |
| JP | 2016-017799 A | 2/2016 |
| JP | 2016-188808 A | 11/2016 |

* cited by examiner

*Primary Examiner* — Luke D Ratcliffe
(74) *Attorney, Agent, or Firm* — ScienBiziP, P.C.

(57) ABSTRACT

A TOF ranging sensor according to Embodiment includes: a light-emitting unit that radiates light beams to subspaces; a light-receiving unit that receives light and forms images of the light on light-receiving elements allocated to the subspaces; and a space control unit that independently controls each element group that includes a light-emitting element and a light-receiving element that are allocated to a common one of the subspaces.

8 Claims, 7 Drawing Sheets

RANGING SENSOR

BACKGROUND

1. Field

The present disclosure relates to a ranging sensor that measures a distance to a target, and particularly to a ranging sensor of a TOF (Time-Of-Flight) method, which is able to be suitably used for a mobile device.

2. Description of the Related Art

As for AF (Auto Focus) control of a camera incorporated in a mobile device such as a smartphone, a conventional method (CDAF: Contrast Detection AF) in which focus is set by using actual image contrast or a PDAF (Phase Detection AF) method in which an imager obtained by integrating a pixel dedicated to parallax calculation with an RGB pixel is used is generally used. In addition thereto, a method in which a TOF (Time-Of-Flight) ranging sensor capable of operating even in a dark place is adopted to thereby assist a higher speed AF operation has been practically used. A TOF ranging sensor having a small size and with low power consumption, which is able to be mounted on a smartphone, is very useful also for collision avoidance in a field of robotics of an automated or an unattended system, such as a drone.

Additionally, a depth camera or a three-dimensional camera (3D camera) which enables three-dimensional spatial mapping by adding depth information (distance information) to a two-dimensional image is a key device for a new user interface using a technique of VR/AR (Virtual Reality/Augmented Reality), MR (Mixed Reality), or SLAM (Simultaneous Localization and Mapping) and there are various ways to approach to realization of the depth camera or the three-dimensional camera as described below.

First, as a system based on a general RGB camera, one that performs stereo matching based on parallax of two cameras, extracts a target, and then performs an inverse operation to a distance map or one that performs an inverse operation to obtain a distance map on the basis of distortion of an image obtained by observing, by one camera, pattern light (structured light) projected on a target is cited, for example. Needless to say, calculation costs of such a system is considerably great.

Additionally, in a field of a stationary game machine that is groundbreaking in a VR technique, an imager used only for a TOF method, in which infrared light is steadily amplitude-modulated (subjected to CW-AM) to radiate the infrared light to an entire space and a phase difference of a reflected light beam is extracted in a pixel unit, that is, a TOF camera has been practically used (sometimes referred to as an RGBD (RGB+Depth) camera in combination with an RGB camera).

On the other hand, when ranging performance with a relatively long distance and high accuracy in an outdoor space is demanded for an LIDAR (Light Detection and Ranging) for military use or on-vehicle use, a configuration in which a one-dimensional ranging sensor whose transmission and reception view range is narrow as several mrad or less and which easily excludes disturbance light is used for mechanical scanning has been used for a long time. In this case, ranging by the TOF method is completed in a very short time with one shot, but when mapping data of a three-dimensional space is generated, a frame rate remarkably decreases.

Recently, a scan pattern generating unit of the structured light or a mechanical scanning unit of transmission light is realized by a high-speed projection technique using a MEMS mirror to perform exclusive design as a TOF imager in which a receiving system is operated in synchronization with the scan pattern generating unit or the mechanical scanning unit, and thereby low power consumption and a high pixel of the depth camera are progressed (for example, Japanese Unexamined Patent Application Publication No. 2014-59301).

Meanwhile, particularly in a field of an optical wireless communication, there have been many proposals for achieving speeding up or reduction in power consumption by space division multiplexing until, now (for example, Japanese Unexamined Patent Application Publication (Translation of PCT Application) No. 2004-503175). Light-receiving elements are arrayed to function as a focal plane array, and thereby improvement of S/N is achieved by narrowing a field of view of each pixel. The related arts are useful techniques for a relatively expensive and large-scale optical transmission and reception system that includes a master station (base station) which functions as a hub, but are required to incorporate specific hardware including a terminal node to be accommodated and a common communication protocol, so that the use is limited to a specific application and has not been fully spread.

It is substantially difficult to apply the conventional three-dimensional spatial mapping system as described above to a mobile device (mobile terminal) such as a smartphone for a reason described below, and this is one of obstacles to spread the technique such as VR/AR or MR.

For example, when a full depth map is generated by a calculation-based system using the RGB camera, it is assumed that an entire space is continuously illuminated. Additionally, in a case of using a structured light method, it is necessary to use infrared light as irradiation light so as not to affect the RGB camera and use a high pixel infrared imager used only for the TOF. Since light irradiation to the entire space is indispensable in any case including use in a dark place, total power consumption required for updating the depth map with a general video frame rate (30 fps/60 fps) easily reaches an order of several W.

Though reduction in a size and power consumption of the structured light irradiation system is progressed together with an optical projection technique by the MEMS mirror, it is still difficult to cope with a high speed frame rate, and it is also difficult to avoid an increase in costs due to an increase in the number of components, which results from complication of an entire system. Needless to say, a system requiring mechanical scanning is not suitable for use in a mobile device due to restriction of a size.

As above, a three-dimensional camera system which is able to be suitably used for feedback of depth information of a target to a mobile device in a VR/AR space has not been realized yet.

An aspect of the disclosure is made in view of the aforementioned series of problems and provides a ranging sensor of a TOF method, which operates in cooperation with an RGB camera module mounted on a mobile device and achieves reduction in all of power consumption, a size, and costs.

SUMMARY

In order to solve the aforementioned problem, a ranging sensor according to an aspect of the disclosure is a ranging sensor of a TOF method, which operates in cooperation with at least one camera module, measures time during which a beam radiated to a space is reflected by a target and returned, and generates distance information of the target for generating three-dimensional positional information by combining the distance information with image information acquired by the camera module, and the ranging sensor includes: a light-emitting unit that includes a plurality of light-emitting elements arranged in plane and radiates, toward subspaces obtained by dividing the space, light from the light-emitting elements, which are allocated to the subspaces, with the light formed into a beam by a light emitting lens system; a light-receiving unit that, includes a plurality of light-receiving elements arranged in plane, and receives reflected light beams from the subspaces and forms images of the reflected light beams on the light-receiving elements, which are allocated to the subspaces, by a light receiving lens system; and a space control unit that independently controls each element group that includes at least one light-emitting element and at least one light-receiving element that are allocated to a common one of the subspaces.

DESCRIPTION OF THE EMBODIMENTS

Embodiment 1

Hereinafter, an embodiment of the disclosure will be described as follows on the basis of FIG. 1 to FIG. 4. In the present embodiment, an example of a three-dimensional camera system that includes a ranging sensor according to the disclosure will be described.

[Outline of Three-Dimensional Camera System]

Figure 1:
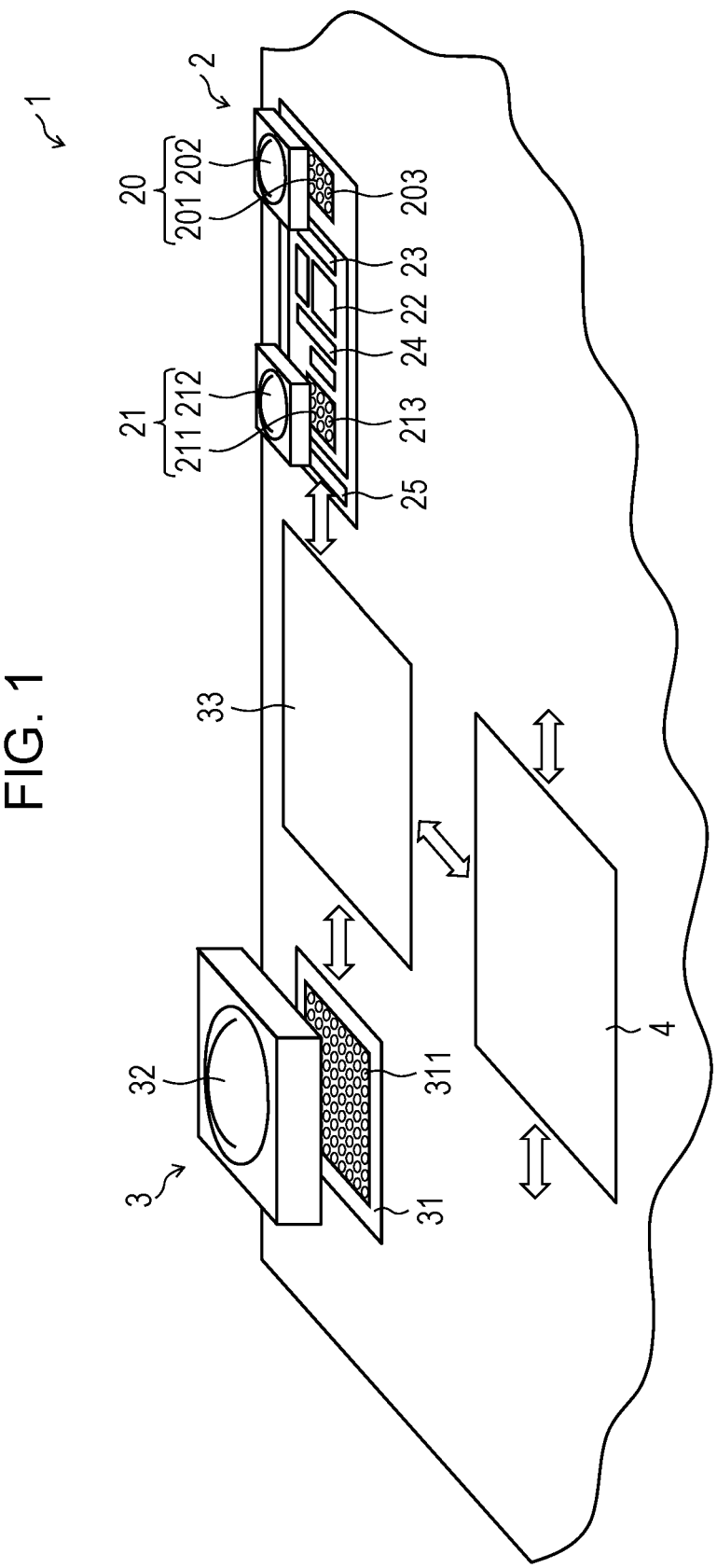
FIG. 1 is a perspective view illustrating a schematic configuration of a three-dimensional camera system according to Embodiment 1 of the disclosure.

First, an outline of the three-dimensional camera system according to the present embodiment will be described with reference to FIG. 1. FIG. 1 is a perspective view illustrating a schematic configuration of the three-dimensional camera system according to the present embodiment. The three-dimensional camera system according to the present embodiment is mounted on a mobile device (mobile terminal) such as a smartphone, smart glasses, a head-mounted display, or a device of a development type thereof.

The three-dimensional camera system includes a TOF ranging sensor (ranging sensor) 2 and an RGB camera module (camera module) 3. The three-dimensional camera system adds distance information (depth information) of a target (target to be measured), which is generated by the TOF ranging sensor 2, to two-dimensional imaging data (image information) of the target imaged by the RGB camera module 3 and generates a three-dimensional image (three-dimensional positional information).

The TOF ranging sensor 2 is a ranging sensor of a TOF (Time-of-Flight) method, which is operable in cooperation with the RGB camera module 3 via a communication unit 25. The TOF ranging sensor 2 receives a reflected light beam that is reflected by a target that exists in a space (irradiation space) irradiated with irradiation light (usually, pulse light) and detects flight time (delay time) of the light beam to thereby measure a distance from the TOF ranging sensor 2 to the target.

The RGB camera module 3 is a standard camera module that is mounted on a mobile device. The RGB camera module 3 includes at least an APS (Active Pixel Sensor) 31 in which a plurality of image sensors (pixels) 311 are arranged in plane (in matrix), an imaging lens system 32, and an ISP (Image Signal Processor) 33. As the RGB camera module 3, various configurations such as a configuration in which the APS (image sensor array) 31 and the imaging lens system 32 are mounted, a configuration in which the ISP 33 is also integrated in addition to the APS 31 and the imaging lens system 32, and a configuration in which the APS 31 and the ISP 33 are made in a CSP (Chip-Size Package) are usable, and an entire image processing system including such a configuration constitutes the three-dimensional camera system.

In the mobile device, a device such as the RGB camera module 3 or a display (not illustrated) is generally interfaced with an application processor 4 of a host system 1 in conformity with the MIPI standard. Similarly, the TOF ranging sensor 2 may be also interfaced with the application processor 4 directly. Alternatively, there may be a case where the TOF ranging sensor 2 is connected to the application processor 4 via a dedicated processor (not illustrated) for generating a three-dimensional image. In this case, all of the APS 31 and the ISP 33 in the RGB camera module 3 and the TOF ranging sensor 2 are to be connected to the dedicated processor and mutually interfaced.

Output data of the TOF ranging sensor 2 according to the present embodiment is characterized by being smaller than output data of the RGB camera module 3, so that the TOF ranging sensor 2 may be connected to the ISP 33, the dedicated processor, or the application processor 4 in conformity with a general serial communication standard such as I2C, I3C, or SPI. In any case, it is only necessary that the TOF ranging sensor 2 is able to cooperate with an image processing system of the RGB camera module 3 through the communication unit 25. Note that, the cooperated operation in the disclosure further includes another important meaning, and details thereof will be separately described later.

[Detail of TOF Ranging Sensor]

Figure 2B:
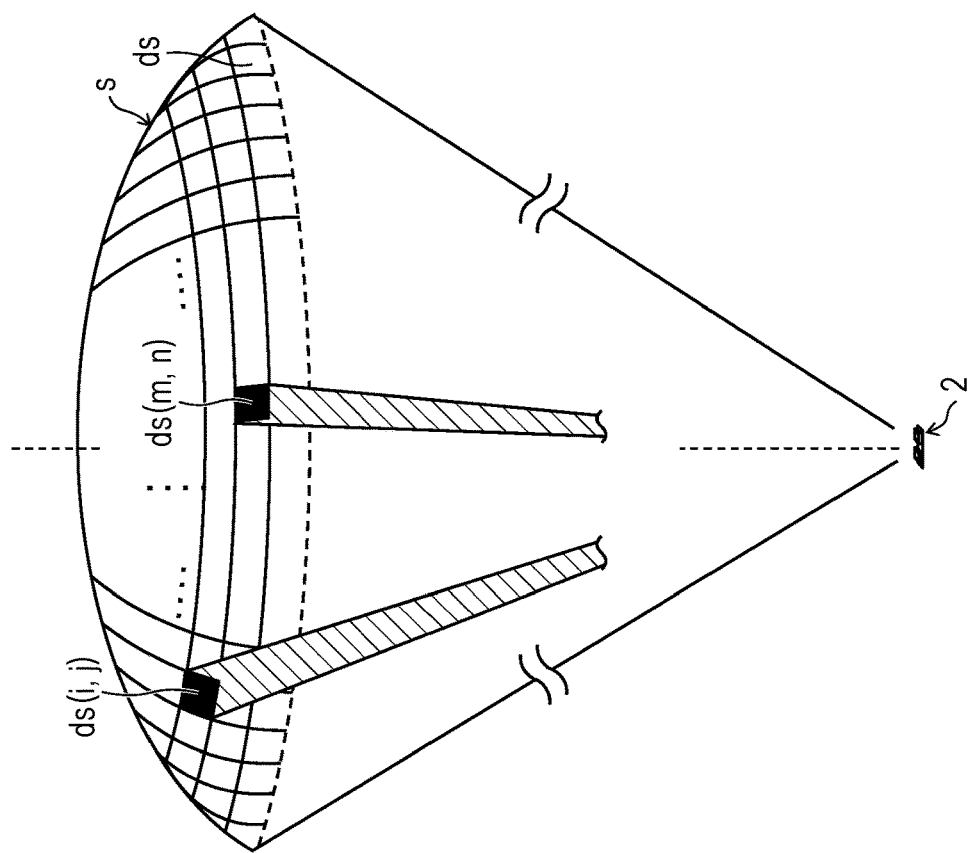
FIGS. 2A and 2B are schematic views each illustrating a state in which a TOF ranging sensor illustrated in FIG. 1 is operating.
Figure 2A:
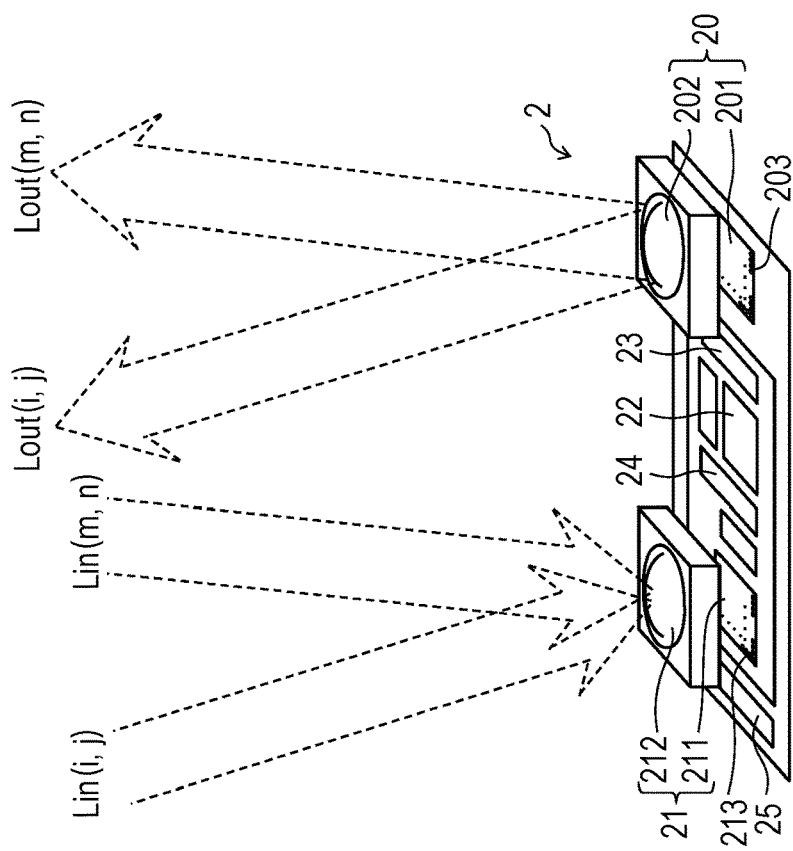

Next, a configuration and an operation of the TOF ranging sensor 2 according to the present embodiment will be described with reference to FIGS. 2A and 2B. FIGS. 2A and 2B are schematic views each illustrating a state in which the TOF ranging sensor 2 illustrated in FIG. 1 is operating. As illustrated in FIGS. 2A and 2B, the TOF ranging sensor 2 includes at least a light-emitting unit 20, a light-receiving unit 21, a space control unit 22, a light-emitting element driving unit 23, a TOF signal processing unit 24, and the communication unit 25.

(Configuration of TOF Ranging Sensor)

First, an example of the configuration of the TOF ranging sensor 2 will be described. A space division multiplex technique is applied to the TOF ranging sensor 2. The TOF ranging sensor 2 radiates a light beam (beam) Lout to each of subspaces ds obtained by dividing a space s into a plurality of spaces. The TOF ranging sensor 2 is configured to be able to receive, with angular resolution, each reflected light beam Lin, which is reflected by any target and returned, to thereby output information of a distance to the target for each of the subspaces ds.

In the figures, two subspaces $ds_{(i,j)}$ and $ds_{(m,n)}$ and light beams $Lout_{(i,j)}$ and $Lout_{(m,n)}$ and reflected light beams $Lin_{(i,j)}$ and $Lin_{(m,n)}$ which respectively correspond to the subspaces $ds_{(i,j)}$ and $ds_{(m,n)}$ are illustrated as an example. That is, the light beam $Lout_{(i,j)}$ is a component of a light beam Lout radiated to the subspace $ds_{(i,j)}$ and the reflected light beam $Lin_{(i,j)}$ is a component of a reflected light beam that the light beam $Lout_{(i,j)}$ is reflected by a target existing in the subspace $ds_{(i,j)}$ and received through the subspace $ds_{(i,j)}$. Similarly, the light beam $Lout_{(m,n)}$ is a component of a light beam Lout radiated to the subspace $ds_{(m,n)}$ and the reflected light beam $Lin_{(m,n)}$ is a component of a reflected light beam that the light beam $Lout_{(m,n)}$ is reflected by a target existing in the subspace $ds_{(m,n)}$ and received through the subspace $ds_{(m,n)}$.

Here, subscripts (i, j) and (m, n) are natural numbers indicating order of the subspaces ds that are arranged in a two-dimensional lattice pattern in an angle region. As illustrated in FIGS. 2A and 2B, when a subspace ds, a light beam Lout, or a reflected light beam Lin is required to be distinguished as a specific one, (i, j) or (m, n) are given. When a subspace ds, a light beam Lout, or a reflected light beam Lin is not distinguished as a specific one and is expressed as a general one, the subscripts are not given, and when a subspace ds, a light beam Lout, or a reflected light: beam Lin is expressed as an optional one, (p, q) are given.

The light-emitting unit 20 includes a light-emitting element array 201 and a light emitting lens system 202. The light-emitting element array 201 is one in which a plurality of light-emitting elements 203 are arrayed in plane tin matrix) so as to cover an entirety of the space s by the light beams Lout. In the present embodiment, the light-emitting element array 201 includes at least 4096 light-emitting elements 203 that are arranged in a squire of 64×64 (an upper limit value of each natural number is 64 or more when a surplus element is included). Each of the light-emitting elements 203 is constituted by, for example, a VCSEL (Vertical-Cavity Surface-Emitting Laser) or the like, and the drive control of each of the light-emitting elements 203 is able to be performed individually.

In the TOF ranging sensor 2, the light-emitting element 203 is allocated (corresponded) to each of the subspaces ds. That is, an FFP (Far-Field Pattern) of each single light-emitting element 203 is adjusted so that a desired emission angle characteristic for the light beam Lout from the light-emitting element 203 allocated to each of the subspaces ds to the subspace ds through the light emitting lens system 202 is achieved, and a distance between a light-emitting surface of the light-emitting element array 201 and an image plane of the light emitting lens system 202 is adjusted in order to suppress occurrence of a gap (spatial region in which irradiation is not able to be performed) between subspaces adjacent to each other. Moreover, by allowing each of the light-emitting elements 203 to be individually turned ON/OFF in accordance with a definition of a subspace group described below, it is possible to independently irradiate each of the subspaces ds with a light beam while covering the entirety of the space s that is subjected to space division multiplexing.

The light-receiving unit 21 includes a light-receiving element array 211 and a light receiving lens system 212. The light-receiving element array 211 is one in which a plurality of light-receiving elements (pixels) 213 are arrayed in plane (in matrix) so as to receive, with angular resolution, the reflected light beams Lin when the light beams Lout are radiated to the subspaces ds obtained by dividing the space s into the plurality of spaces to thereby output information of a distance to a target in each of the subspaces ds. In the present embodiment, the light-receiving element array 211 includes at least 4096 light-receiving elements 213 arranged in a squire of 64×64 at the same pitch as that of the light-emitting element array 201 (an upper limit value of each natural number is 64 or more when a surplus element is included). Each of the light-receiving elements 213 is constituted by, for example, an SPAD (Single-Photon Avalanche Diode) or the like, and an output of each of the light-receiving elements 213 is connected to a front end circuit including at least a first stage gate such as an active quenching resistor or an inverter for each light-receiving element group of the light-receiving elements 213 in accordance with definition of the subspace group described below. A minimum configuration in which such an SPAD is used is an example of the most desirable selection from a viewpoint of forming an integrated array and performing compact multipoint TOF measurement.

In the TOF ranging sensor 2, the light-receiving element 213 is allocated (corresponded) to each of the subspaces ds. That is, an image of each of the reflected light beams Lin from the corresponding one of the subspaces ds is formed on the corresponding one of the light-receiving elements 213 so that the reflected light beam Lin is received by the predetermined light-receiving element 213 through the light receiving lens system 212, and a distance between a light-receiving surface (light-receiving element surface) of the light-receiving element array 211 and an image plane of the light receiving lens system 212 is adjusted in order to suppress occurrence of a gap (spatial region in which light reception is not able to be performed) between subspaces adjacent to each other. By the light receiving lens system 212 and the light-receiving element array 211, a whole set of the subspaces ds each of which is covered by the corresponding one of the light-receiving elements 213 forms the space s.

In this manner, the light receiving lens system 212 is a lens system that is designed by considering image plane distortion so that the light-receiving element array 211 functions as a general FPA (Focal Plane Array). Note that, differently from an imaging lens system of a general camera, the light receiving lens system 212 is only required to be optimally designed only for a wavelength band used for the light beam Lout and the reflected light beam Lin thereof and does not always require design of a high-grade lens that is formed by multiple lens groups, but is desired to be designed by taking other known techniques for realizing easy incorporation, low costs, and low height for mobile use.

In the present embodiment, an element size of each of the light-emitting element array 201 and the light-receiving element array 211 is 64×64 elements and shapes of the light emitting lens system 202 and the light receiving lens system 212 are almost the same. Moreover, each pitch between the light-emitting elements 203 is set as the same as that of the light-receiving elements 213, and design is performed to satisfy 64° which is as an example of a general field angle of a mobile camera. Accordingly, the TOF ranging sensor 2 has angular resolution of about 1° with respect to each of the subspaces ds, which is covered by the corresponding one of the light-emitting elements 203 and the corresponding one of the light-receiving elements 213.

Here, in the present embodiment, it is necessary to perform design so that a subspace ds that is covered by one of the light-emitting elements 203 and a subspace ds that is covered by a corresponding one of the light-receiving elements 213 are common (that is, are spatially matched in a far field). This is because positions at which the light-emitting unit 20 and the light-receiving unit 21 are arranged are adjacent to each other on the same plane, but it is difficult to arrange the light-emitting unit 20 and the light-receiving unit 21 at completely the same position. Therefore, angle deviation correction in consideration of the position shift in advance is necessary. Though this is a problem mainly in mounting of a member in a manufacturing process of the TOF ranging sensor 2, in general, it is possible to solve the problem by performing general active alignment as described below.

For example, when the light receiving lens system 212 of the light-receiving unit 21 is positioned and mounted after mounting of the light-emitting unit 20 is completed and die bonding and wire bonding mounting of the light-receiving elements 213 are completed (a state where an electrical operation as a sensor is enabled), the light beam Lout from a specific light-emitting element 203 is actually radiated to an external diffuse reflection plate, and a position of the light receiving lens system 212 is adjusted and fixed so that an amount of a reflected light beam to a specific light-receiving element 213, on which the reflected light beam is to be originally incident correspondingly to the specific light-emitting element 203, becomes maximum. At this time, it is possible to secure necessary accuracy by using ultraviolet curing resin or the like as an adhesive and curing the adhesive at an appropriate timing.

As above, an outline of an optical system in the TOF ranging sensor 2 has been described except for detailed explanation of the subspace group. Hereinafter, the space control unit 22 for appropriately performing connection processing of each electrical signal will be described and the subspace group will be separately described below together with a content of a specific operation of the TOF ranging sensor 2.

The space control unit 22 individually controls connection to the light-emitting element 203 and connection from the light-receiving element 213 or the front end circuit. The space control unit 22 controls the connection to thereby form an element group which includes the light-emitting element 203 and the light-receiving element 213 that are to be allocated to the aforementioned common subspace $ds_{(p, q)}$, so that it becomes possible to independently execute light emission driving and received signal processing for each element group. For example, as described below, the space control unit 22 forms an aggregate of subspaces ds, which corresponds to one or a plurality of spatial regions (subspace groups) designated by the host system 1 of the TOF ranging sensor 2 and independently controls the driving and the signal processing for each element group in order to simultaneously execute TOF signal processing of the predefined number of channels (TOF channels) with respect to the subspace groups.

The light-emitting element driving unit 23 generates a drive signal on the basis of a control signal from the space control unit 22. Specifically, the light-emitting element driving unit 23 individually switches ON/OFF of driving of each of the light-emitting elements 203 in accordance with the control signal from the space control unit 22. Here, a small number of adjacent light-emitting element groups that are driven at completely the same timing with the same code form an aggregate (beam group) of a plurality of adjacent beams that emit light at the same timing with almost the same intensity, and act as a single beam source that irradiates a wider space.

Similarly, on the basis of the control signal from the space control unit 22, the TOF signal processing unit 24 also inputs output signals, which are output from the light-receiving element array 211, for example, to the front end circuit in a directly bundled manner and converts the output signals into digital signals. Alternatively, the TOF signal processing unit 24 generates an OR signal of a digital output of the front end circuit and performs TOF measurement signal processing for the OR signal.

As described above, connection of a signal line to the TOF signal processing unit 24 is appropriately controlled so that the TOF signal processing of one or a plurality of channels is to be performed for each aggregate of one or a plurality of subspaces ds, which corresponds to one or a plurality of beam groups (light beams Lout) each of which is formed as an aggregate of light beams by performing synchronization of driving in a unit of adjacent light-emitting element groups by the light-emitting element driving unit 23. Such control by the space control unit 22 is executed on the basis of information designated by the host system 1 in advance as an operation of the TOF ranging sensor 2 as described below. Distance information obtained by the TOF signal processing unit 24 is stored in a register in association with each of specific subspaces constituting a subspace group and output to an outside of the TOF ranging sensor 2 via the communication unit 25.

Note that, the TOF signal processing will not be described in detail here since various methods thereof are well known, but a signal processing method (signal processing circuit scale) that is compact and facilitates performing processing of output signals from the light-receiving elements 213 in a parallel manner is desired.

(Operation of TOF Ranging Sensor)

Next, an example of an operation of the TOF ranging sensor 2 will be described. A detection angle range (transmission and reception viewing angle) of the TOF ranging sensor 2 in the present embodiment is ±32° and each of the light-emitting element array 201 and the light-receiving element array 211 is designed so that at least 64×64 effective element regions are squarely arrayed at equal pitches and there is no dead region, and thereby angular resolution of each element (pixel) of the focal plane array is about 1°.

Note that, each of the light-receiving elements (each of the pixels) 213 of the light-receiving element array 211 is connected with the front end circuit, so that there is a case where a fill factor of a part that purely contributes to light reception on the light-receiving surface of the light-receiving element array 211 is lowered. In this case, by using a well-known technique such as a method in which micro lenses are densely formed on the light receiving surface that includes the front end circuit and thereby an optical fill factor is made close to 1, it is possible to realize the angular resolution described above.

Minimum angular resolution of about 1° that is determined as described above corresponds to an image height of about 1.8 cm at a distance of 1 m in a real space. Therefore, granularity which is practically sufficient for a three-dimensional mapping accuracy in a case of being used for a mobile device is able to be realized. Here, in the present embodiment, it is not assumed that TOF measurement of an entire viewing angle is continuously performed with the minimum angular resolution of the sufficient granularity described above. That is, it is possible to continuously acquire only necessary and sufficient distance information with the sufficient accuracy by parallel processing the number of which is sufficient without continuously radiating a light beam to the entire viewing angle.

In an example of a reception circuit of the TOF ranging sensor 2 according to the present embodiment, it is assumed that it is configured so that TOF signals of 16 channels are simultaneously subjected to parallel processing and 16 distance informations are able to be acquired in one measurement cycle. The number of parallel processing is a finite value defined when the reception circuit is designed and is not able to be increased freely. Conversely, when the number of parallel processing is made much smaller than the number of array pixels (the number of elements), it is possible to greatly reduce power consumption on a light emission side. In this case, needless to say, it is difficult to simultaneously obtain distance information with the minimum angular resolution (1°) over an entire field angle, but, when the TOF ranging sensor 2 is caused to operate by a method described below after the subspace group is defied, it is possible to greatly reduce total power consumption of the TOF ranging sensor 2, which is consumed mainly on the light emission (light-emitting unit 20) side, by at least one digit, compared with a three-dimensional camera system of a conventional method such as a stereo camera or a structured light method.

FIGS. 3A to 3E are schematic views for explaining an example of a method of generating distance information in the TOF ranging sensor 2 illustrated in FIGS. 2A and 2B. Here, an example of a method in which 16 distance informations are generated by using the TOF signal processing unit 24 of 16 channels with respect to the field angle of 64° described above to simultaneously perform parallel processing of TOF signals of the 16 channels will be described. The TOF ranging sensor 2 defines a first subspace group $dsg_1$ (subspace group) by dividing the space s (field angle) in accordance with, for example, five patterns described below, and generates the distance informations on the basis of the defined first subspace group $dsg_1$. Note that, the patterns for defining the first subspace group $dsg_1$ are not limited to the following ones.

Figure 3A:
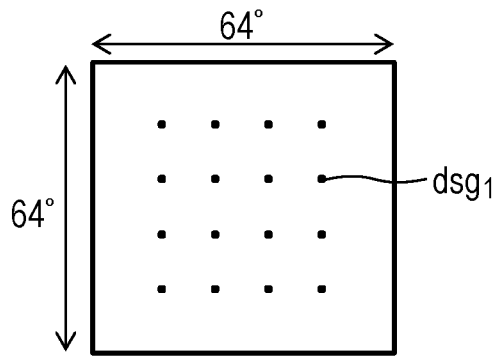
FIGS. 3A to 3E are schematic views for explaining an example of a method of generating distance information in the TOF ranging sensor illustrated in FIGS. 2A and 2B.

As illustrated in FIG. 3A, in an operation mode (a), the first subspace group $dsg_1$ corresponds to one subspace ds (that is, one light-receiving element 213), and the number of first subspace groups $dsg_1$ is able to be simultaneously designated up to 16 at any positions in the entire field angle. An angle width formed by each of the first subspace groups $dsg_1$ is 1° which is the same as the minimum angular resolution. By performing the TOF signal processing of 1 channel for each of the 16 first subspace groups $dsg_1$, it is possible to acquire distance informations of 16 points in total (angular resolution of 1°).

Figure 3B:
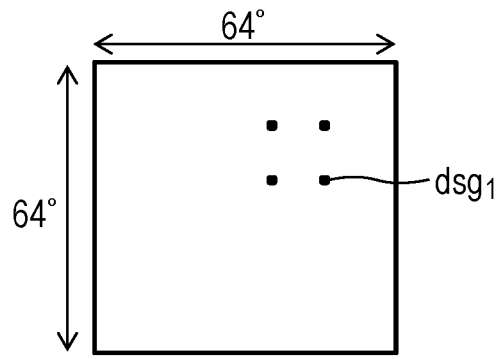

As illustrated in FIG. 3B, in an operation mode (b), the first subspace group $dsg_1$ corresponds to 4 (2×2) subspaces ds (that is, 2×2 light-receiving elements 213) arranged in an adjacent manner in a square form, and the number of first subspace groups $dsg_1$ is able to be simultaneously designated up to 4 at any positions in the entire field angle. An angle width of each of the first subspace groups $dsg_1$ is 2° which is twice as much as the minimum angular resolution. By performing the TOF signal processing of 4 channels in parallel for each of the 4 first subspace groups $dsg_1$, it is possible to acquire distance informations of 4 points in each of the 4 first subspace groups $dsg_1$, that is, 16 points in total (angular resolution of 1°).

Figure 3C:
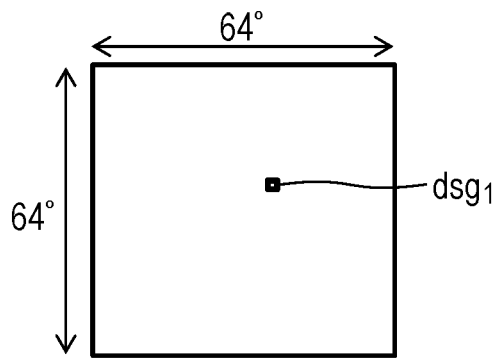

As illustrated in FIG. 3C, in an operation mode (c), the first subspace group $dsg_1$ corresponds to 16 (4×4) subspaces ds (that is, 4×4 light-receiving elements 213) arranged in an adjacent manner in a square form, and one first subspace group $dsg_1$ is able to be designated at any position in the entire field angle. An angle width of the first subspace group $dsg_1$ is 4° which is four times as much as the minimum angular resolution. By performing the TOF signal processing of 16 channels in parallel for the first subspace group $dsg_1$, it is possible to acquire distance informations of 16 points in total (angular resolution of 1°).

Figure 3D:
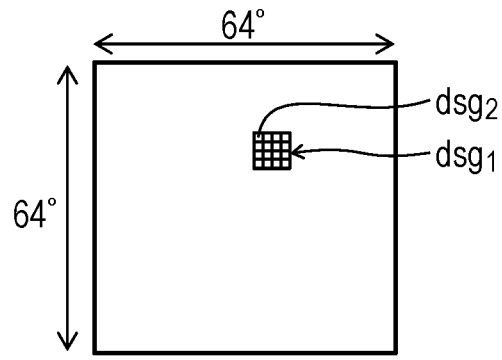

As illustrated in FIG. 3D, in an operation mode (d), in the first subspace group $dsg_1$, second subspace groups $dsg_2$ in which transmission/reception signals in a region corresponding to 16 (4×4) subspaces ds (that is, 4×4 light-receiving elements 213) arranged in an adjacent manner in a square form are combined into one channel by an OR operation are further defined. At any positions in the entire field angle, 16 second subspace groups $dsg_2$ are able to be designated. For example, when the first subspace group $dsg_1$ that is constituted by 16 (4×4) second subspace groups $dsg_2$ arranged in the adjacent manner in a square form as illustrated is defined, one first subspace group $dsg_1$ is able to be designated at any position in the entire field angle. An angle width of each of the second subspace groups $dsg_2$ is 16° which is 4×4 times as much as the minimum angular resolution. By performing the TOF signal processing of 1 channel in parallel for each of the 16 second subspace groups $dsg_2$, it is possible to acquire distance informations of 16 points in total (angular resolution of 4°).

Figure 3E:
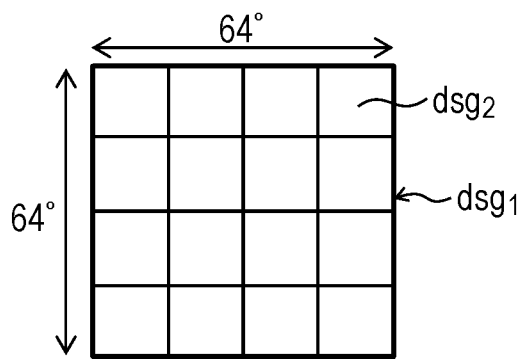

As illustrated in FIG. 3E, in an operation mode (e), in the first subspace group $dsg_1$, second subspace groups $dsg_2$ in which transmission/reception signals in a region corresponding to 256 (16×16) subspaces ds (that is, 16×16 light-receiving elements 213) arranged in an adjacent manner in a square form are combined into one channel by an OR operation are further defined. An angle width of each of the second subspace groups $dsg_2$ is 16° which is 16 times as much as the minimum angular resolution. When the first subspace group $dsg_1$ that is constituted by 16 (4×4) second subspace groups $dsg_2$ arranged in the adjacent manner in a square form as illustrated is defined, the entire field angle is covered, so that it is not necessary to designate positions of the second subspace groups $dsg_2$. By performing the TOF signal processing of 1 channel in parallel for each of the 16 second subspace groups $dsg_2$, it is possible to acquire distance informations of 16 points in total (angular resolution of 16°).

In this manner, in the operation modes (a) and (b), distance informations of a plurality of objects (targets) the number of which is up to 16 is able to be simultaneously captured at a frame rate of the RGB camera module 3. By appropriately selecting a size and the position of the first subspace group $dsg_1$, it is possible to continuously acquire data useful for object tracking. On the other hand, in the operation mode (c), it is possible to generate a depth map of the angular resolution of 1° and 4×4=16 channels at the frame rate of the RGB camera module 3 for a specific region (in this example, a square region of 4°×4° at any position). For example, when an object is extracted from a camera image (image information), it is possible to acquire, with high accuracy, distance information that is useful in image analysis of a specific region in which a plurality of targets exist locally and intricately.

Additionally, in the operation mode (d), after every 4×4=16 array elements are bundled and the angular resolution is roughed to 4 times, distance information that is useful in object extraction for a specific region (square region that is wider than a region of 16°×16°) is able to be acquired, similarly to the operation mode (c).

Lastly, in the operation mode (e), though the angular resolution is roughed up to 16° by dividing the entirety having a field view of 64° into squares of 4×4=16, it is possible to cope with multi points used for general high-speed AF. That is, though it is necessary to irradiate the entire field angle with the light beam Lout in the case of the operation mode (e), the example is equivalent to acquire distance informations of 16 points by one TOF ranging sensor 2 while covering the entire field angle of the RGB camera module 3 as if 4×4=16 one-dimensional TOF sensors each having a general entire viewing angle (whole width viewing angle) of 16° were virtually and densely arranged and operated in parallel.

Needless to say, the numerical values and details of the exemplified operation modes are not limited to the contents described above, and any derivative development is possible. What is important here is that, by designating the operation mode in advance from a side of the host system 1 with respect to the TOF ranging sensor 2 by serial communication or switching the operation mode immediately at any timing, desired distance information which changes depending on a situation is able to be acquired by using a tiny number of channels and a tiny number of emission beams, that is, extremely low power consumption of the TOF ranging sensor 2. As is apparent, from the above description, the TOF ranging sensor 2 is able to acquire depth information that is truly useful in application to three-dimensional mapping for a mobile terminal while reducing influence on a battery of the mobile terminal.

The designation of the subspace group (first subspace group $dsg_1$, second subspace group $dsg_2$) from the side of the host system 1 is only a concrete design content and thus will not be described in detail, but, on the basis of the examples of FIGS. 3A to 3E, it is basically possible to perform the designation, for example, by writing, in the register of the TOF imaging sensor 2, a vector such as {x, y, d} for each subspace. For example, a sub-vector of {x, y} that is described above is a position vector (whose unit corresponds to an angle) which indicates a two-dimensional position in the field angle of the camera (RGB camera module 3), and a subspace whose size of one side is {d} is able to be designated by starting from {x, y}. Alternatively, a size of the subspace may also be defined as a rectangular such as {x, y, dx, dy}. In each of the examples of FIGS. 3A to 3E, it is possible to designate such vectors up to 16.

Note that, it is also possible to acquire 15 distance informations or less by using the TOF signal processing unit 24 of 16 channels. Thereby, it is possible to further reduce the power consumption of the TOF ranging sensor 2.

Figure 4:
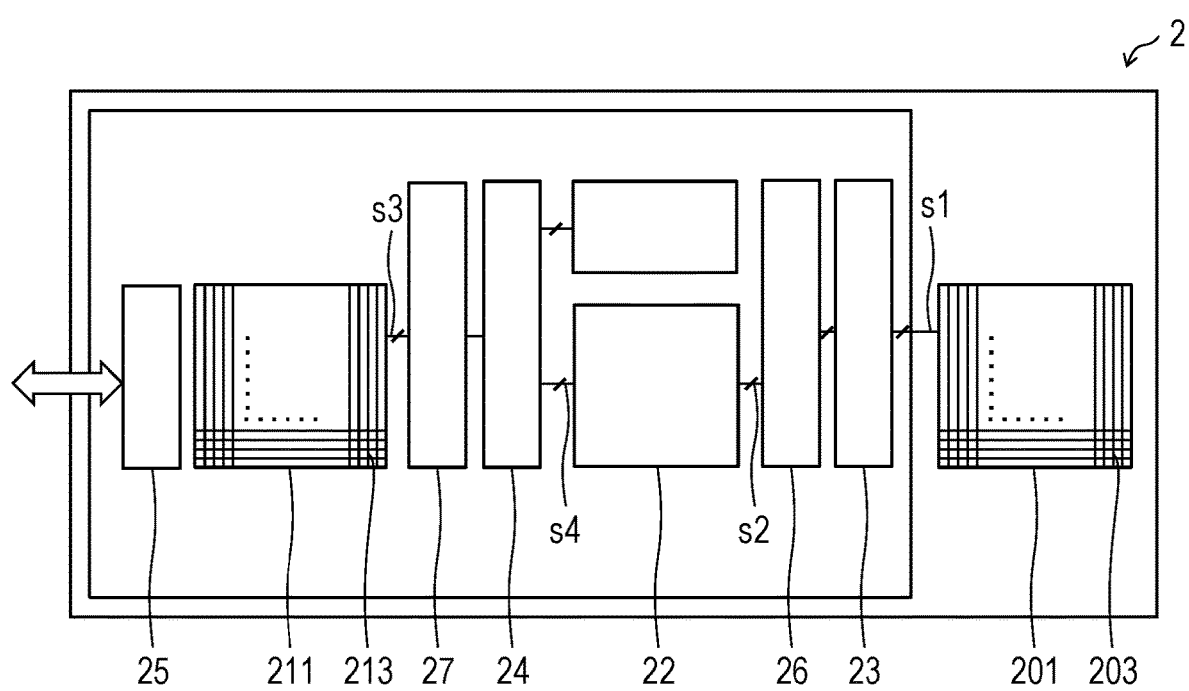
FIG. 4 is a plan view for explaining a flow of signal processing in the TOF ranging sensor illustrated in FIGS. 2A and 2B.

Next, details of the signal processing in the TOF ranging sensor 2 will be described more specifically with reference to FIG. 4. FIG. 4 is a plan view illustrating a circuit block configuration of the TOF ranging sensor 2 according to the present embodiment and illustrates components illustrated in the perspective views of FIG. 1 and FIGS. 2A and 2B in more detail.

A drive signal s1 to each of the light-emitting elements 203 of the light-emitting element array 201 is generated in the light-emitting element driving unit 23 on the basis of a control signal s2 from the space control unit 22, which has passed through an activator 26. Note that, in this case, it is to be noted that timing skew is prevented from occurring between drive signals s1 each of which switches ON/OFF of driving of a corresponding one of the light-emitting element 203. The light-emitting element driving unit 23 distributes an ON/OFF signal to the light-emitting element 203 to be driven (caused to emit light) and outputs only an OFF signal to the light-emitting element 203 not to be driven. Though not illustrated, bias current having a variable value or a fixed value, which compensates for threshold current, may be supplied to each of the light-emitting elements 203.

The TOF ranging sensor 2 performs control that, among aggregates of the subspaces ds subjected to space division multiplexing, only a light-emitting element group of the light-emitting element 203 allocated to a subspace ds that forms the first subspace group $dsg_1$ defined as the above-described operation mode designated in advance by the side of the host system 1 to the TOF ranging sensor 2 is caused to emit light and a light-emitting element group of the light-emitting element 203 that is not designated by the host system 1 is shut down, for example. Thereby, it is possible to finely control the space (angle) region in which the TOF ranging sensor 2 actually performs sensing.

In this manner, by irradiating only the designated first subspace group $dsg_1$ with the light beam Lout (or an aggregate thereof), the TOF ranging sensor 2 irradiates only the designated first subspace group $dsg_1$ with the light beam Lout, so that it is possible to drastically reduce power consumption of the TOF ranging sensor 2. For example, in the example of the operation mode (c) explained by using FIG. 3C, an entirety of a space (angle) region in which a sensing operation is actually performed is only 4°×4° of the field angle of 64°×64°. Therefore, necessary total light emission power is about $1/256$ times compared with a case where the entire field angle is irradiated. Also in the example of the operation mode (d), since necessary total light emission power is reduced to about $1/16$ times, the TOF ranging sensor 2 is able to achieve reduction in power consumption by 2 to 3 digits compared with a conventional technique that has accuracy (angular resolution) of an equivalent level.

Additionally, all of output signals s3 from the light-receiving elements 213 of the light-receiving element array 211 are once input to a selector 27. Also in this case, similarly, it is to be noted that timing skew is prevented from occurring between the output signals s3. In the TOF ranging sensor 2, on the basis of a control signal s4 from the space control unit 22, a sum of current outputs is calculated in a unit of the light-receiving element 213 at an input portion (not illustrated) to an inside of the selector 27 (analog OR operation). Alternatively, a logical sum of digital signals is calculated at an output portion (not illustrated) from the selector 27 to the TOF signal processing unit 24 (digital OR operation). Note that, in the example indicated as the operation mode (a) in FIG. 3A, since each of the first subspace groups $dsg_1$ is associated with a pixel of the corresponding one of the light-receiving elements 213 in a one-to-one manner, the OR operation described above is unnecessary.

The TOF ranging sensor 2 performs fine control that, among aggregates of the subspaces ds subjected to space division multiplexing, only an output of an element group of the light-receiving element 213 allocated to a subspace ds that forms the first subspace group $dsg_1$ defined as the above-described operation mode designated in advance by the side of the host system 1 to the TOF ranging sensor 2 is selected or combined to be input to the TOF signal processing unit 24 and an output other than the above-described output, which is from an element group of the light-receiving element 213 that is not designated by the host system 1, is not input to the TOF signal processing unit 24, for example. Thereby, it is possible to finely control the space (angle) region in which the TOF ranging sensor 2 actually performs sensing.

In this manner, the TOF ranging sensor 2 performs the TOF signal processing of the reflected light beam Lout that is reflected by one or a plurality of targets only for the designated first subspace group $dsg_1$. Thereby, the TOF ranging sensor 2 is able to set desired spatial (angle) resolution for the designated first subspace group $dsg_1$, that is, freely and acquire, from reciprocation time of the reflected light beam Lout from any part of one or a plurality of targets, distance information thereof.

In the above-described manner, in the TOF ranging sensor 2, a plurality of distance informations (of 16 channels in the present embodiment) acquired in a two-dimensional subspace group (two-dimensional angle region with respect to the real space), which is designed in advance and constituted by the subspaces ds, with the angular resolution that is designated in advance are stored in the register. The RGB camera module 3 (host system 1) is able to access the distance information via the communication unit 25 and generate desired three-dimensional depth information by a one-dimensional distance method obtained with respect to the first subspace group $dsg_1$ that is designated in advance, that is, two-dimensional angle coordinates in the real space.

The method in which the TOF ranging sensor 2 acquires the distance information by designating the first subspace group $dsg_1$ from the side of the host system 1 as described above is greatly useful for reducing a load of image rendering processing in the host system 1. On the other hand, as described below, in the TOF ranging sensor 2, it is also possible to determine whether or not a target exists in the subspaces ds constituting the two-dimensional subspace group (two-dimensional angle region with respect to the real, space) that is designated in advance.

In general, distance information (a distance estimation value based on TOF signal processing) output from the TOF ranging sensor 2 greatly fluctuates in accordance with shortage of a light amount of a signal or SNR (Signal-to-Noise Ratio) due to a ranging limit (a long distance, low reflectivity, a large amount of disturbance light, or the like) and reproducibility is deteriorated. Additionally, when the SNR falls below an allowable limit value, a TOF distance estimation value diverges and an average value thereof becomes unable to be defined. It is not desirable to notify the host system 1 of data with such low reliability as it is for an operation, so that the TOF signal processing unit 24 usually applies an error flag for each output distance information. The flag is expressed as an invalid bit that indicates invalidity which is caused because the distance estimation value or a variable deviation thereof deviates from a predefined range or a warning or error bit based on an action of any measurement value or estimation value obtained in a process of the TOF signal processing, and is information indicating reliability of the distance information. Note that, also on the side of the host system 1, processing of avoiding fatal operation failure, such as processing of acquiring a running average of the distance information output from the TOF ranging sensor 2 to monitor a situation of the SNR, is generally performed.

On the basis of the example of determination processing described above, when it is determined, in an inside of the TOF ranging sensor 2, that the SNR is remarkably lowered (the reliability of the distance information is not sufficient), it is possible to consider that a reflecting object (target) that is to be targeted for ranging "does not exist" in the subspace ds or the two-dimensional subspace group (to mask the corresponding distance estimation value with the flag so that the host system 1 does not adopt the distance estimation value).

Furthermore, the space control unit 22 is also able to control driving of each of the light-emitting elements 203 corresponding to the subspaces ds or the element group and connection (the aforementioned analog sum or digital logical sum) of each of the light-receiving elements 213 or the element group on the basis of information of presence or absence of a target, which is determined in each subspace ds included in the first subspace group $dsg_1$ that is designated in advance as described above. As a result, it is possible to achieve further reduction in power consumption by locally stopping an internal operation of the TOF ranging sensor 2 from the space control unit 22, for example, so as not to cause the TOF ranging sensor 2 to emit the light beam Lout or to perform the TOF signal processing for the subspace ds in which useful distance information is not able to be acquired in the first subspace group $dsg_1$ that is designated in advance.

(Effect of TOF Ranging Sensor)

As above, the ranging sensor 2 according to the present embodiment is a ranging sensor of a TOF method, which operates in cooperation with the RGB camera module 3, measures time during which a light beam Lout radiated to the space s is reflected by a target and returned, and outputs distance information of the target, by which three-dimensional positional information is generated by combining the distance information with image information acquired by the RGB camera module 3, and the ranging sensor includes: the light-emitting unit 20 that includes the plurality of light-emitting elements 203 arranged in plane and radiates, toward each of the subspaces ds obtained by dividing the space s, light emitted from a corresponding one of the light-emitting elements 203, which are allocated to the subspaces ds, by forming the light into a beam by the light emitting lens system 202; the light-receiving unit 21 that includes the plurality of light-receiving elements 213 arranged in plane and receives a reflected light beam Lin that is received from each of the subspaces ds by forming an image of the reflected light beam Lin on a corresponding one of the light-receiving elements 213 by the light receiving lens system 212; and the space control unit 22 that independently controls each element group that includes the light-emitting element 203 and the light-receiving element 213 that are allocated to a common one of the subspaces ds.

Since the TOF ranging sensor 2 is able to independently control each element group including the light-emitting element 203 and the light-receiving element 213 each of which is allocated to the subspace ds, it is possible to efficiently operate the TOF ranging sensor 2 by selectively driving only a minimum number of element groups. Additionally, there is no need to provide a MEMS mirror or the like as conventional, so that it is possible to achieve simplification of a device configuration while keeping spatial resolution with high ranging accuracy, and to thereby facilitate reduction in a size and costs.

Additionally, the TOF ranging sensor 2 starts an operation by designating, in advance, division of the entirety of the subspaces ds into an integral number of first subspace groups $dsg_1$, which is equal to the predefined number of channels, on the basis of image information from the RGB camera module 3 (host system 1) capable of operating in cooperation. Thereby, it is possible to acquire distance informations of any number of first subspace groups $dsg_1$, the number of which is equal to the number of channels, and output the distance informations to the host system 1.

Thus, according to the present embodiment, it is possible to realize the TOF ranging sensor 2 of a TOF method, which is most suitable to be mounted on a mobile device, operates in cooperation with the RGB camera module 3, and is able to achieve reduction in all of power consumption, a size, and costs.

Note that, when a position of a target that is determined to exist in the first subspace group $dsg_1$ designated in advance by the RGB camera module 3 (host system 1) changes with time (when the target moves), in the subsequent TOF signal processing, it is also possible to execute two-dimensional tracking TOF ranging that the TOF ranging sensor 2 itself automatically supplements the target (that is, the TOF ranging sensor 2 itself estimates the position and a moving amount of the target) to continue the TOF signal processing. Alternatively, instead of designating the first subspace group $dsg_1$ in advance by the host system 1, it is also possible that, prior to the operation, the TOF ranging sensor 2 itself divides the entire field angle, performs scanning, and determines a subspace in which a target exists, and then the TOF ranging sensor 2 itself automatically supplements the target to execute two-dimensional tracking TOF ranging similarly to the above. Details thereof will be described in Embodiment 2.

Embodiment 2

Hereinafter, another embodiment of the disclosure will be described with reference to FIGS. 5A and 5B to FIGS. 7A and 7B as follows. Note that, for convenience of description, the same reference signs will be assigned to members having the same functions as the members described in the aforementioned embodiment, and description thereof will be omitted.

(Configuration of TOF Ranging Sensor)

Figure 5B:
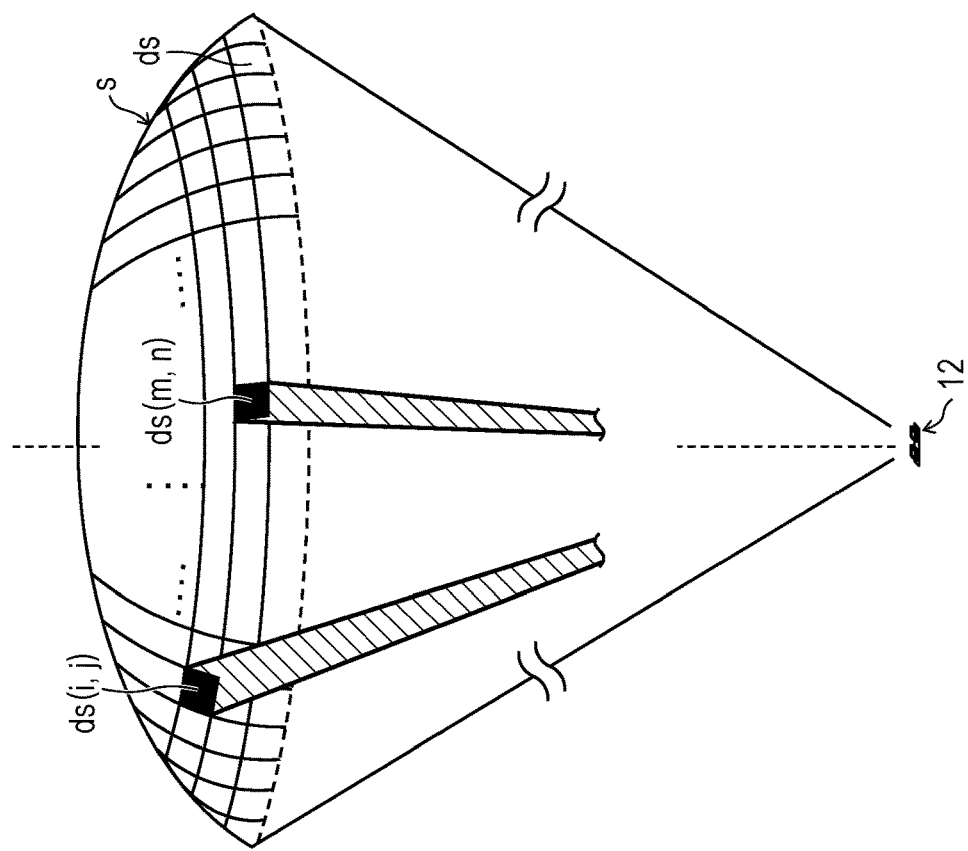
FIGS. 5A and 5B are schematic views each illustrating a state in which a TOF ranging sensor according to Embodiment 2 of the disclosure is operating.
Figure 5A:
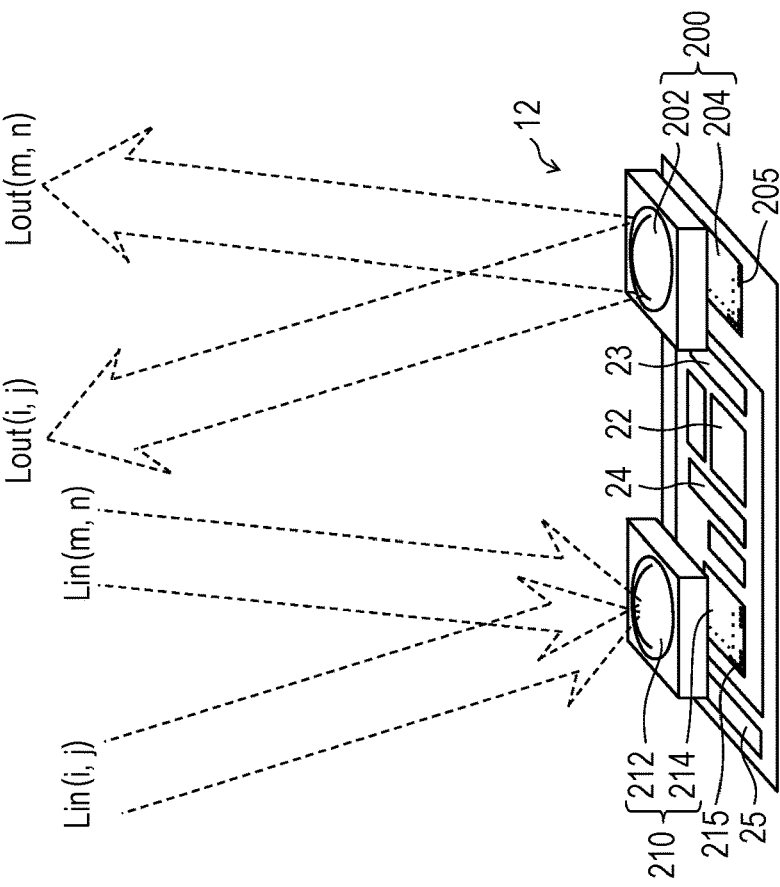

FIGS. 5A and 5B are schematic views each illustrating, similarly to FIGS. 2A and 2B of Embodiment 1, a state in which a TOF ranging sensor 12 of the present embodiment is operating. The TOF ranging sensor 12 includes at least a light-emitting unit 200, a light-receiving unit 210, the space control unit 22, the light-emitting element driving unit 23, the TOF signal processing unit 24, and the communication unit 25. The space division multiplex technique is applied to the TOF ranging sensor 12 similarly to Embodiment 1 so that the TOF ranging sensor 12 is configured to be able to radiate a light beam Lout to each of the subspaces ds obtained by dividing the space s into a plurality of spaces and receive, with angular resolution, each reflected light beam Lin that is reflected by any target and returned to thereby output information of a distance to the target for each of the subspaces ds.

Figure 6:
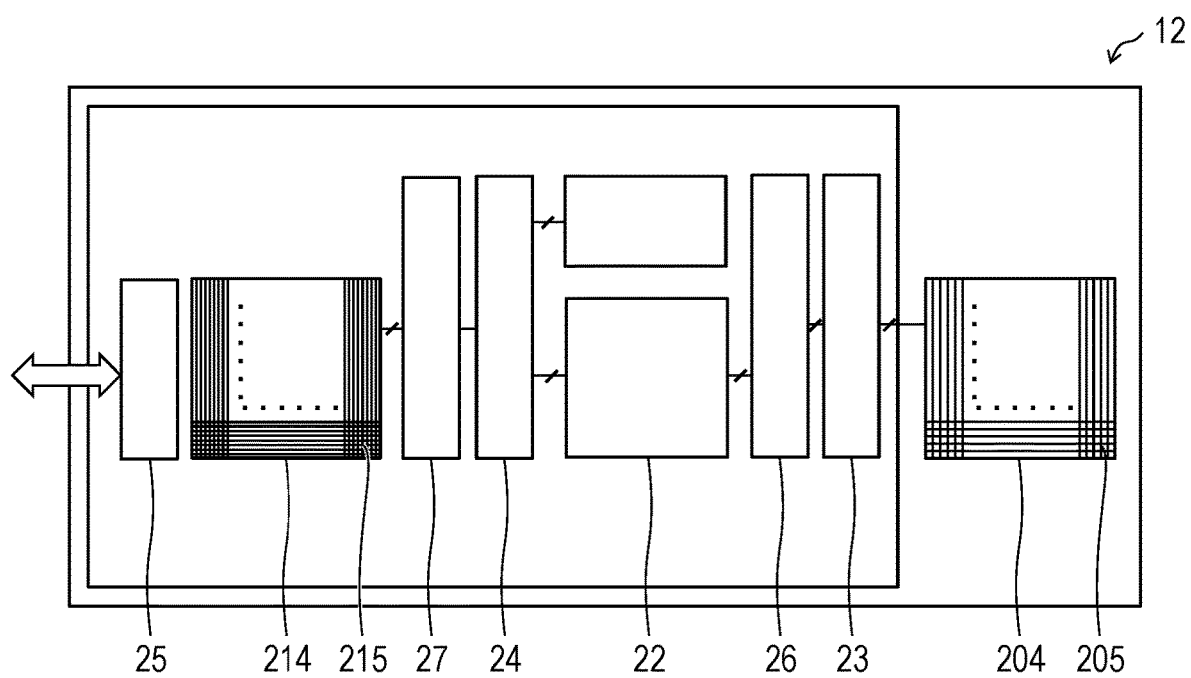
FIG. 6 is a plane view illustrating a circuit block configuration of the TOF ranging sensor illustrated in FIGS. 5A and 5B.

FIG. 6 is a plan view illustrating a circuit block configuration of the TOF ranging sensor 12 according to the present embodiment. The TOF ranging sensor 12 according to the present embodiment is different from the TOF ranging sensor 2 described in the aforementioned embodiment mainly in that light-emitting elements 205 of a light-emitting element array 204 are arranged more densely than the aforementioned light-emitting elements 203 of the light-emitting element array 201 and light-receiving elements 215 of a light-receiving element array 214 are arranged more densely than the aforementioned light-receiving elements 213 of the light-receiving element array 211.

The light-emitting element array 204 in the present embodiment includes 72×72 light-emitting elements 205 arranged in a square form. The light-receiving element array 214 has an external shape size that is the same as that of the light-emitting element array 204, but includes 144×144 light-receiving elements 215 arranged in a square form at a half pitch. That is, the number of light-receiving elements 215 arranged in the light-receiving element array 214 is 4 times (multiple) as many as the number of light-emitting elements 205 arranged in the light-emitting element array 204.

Figure 7A:
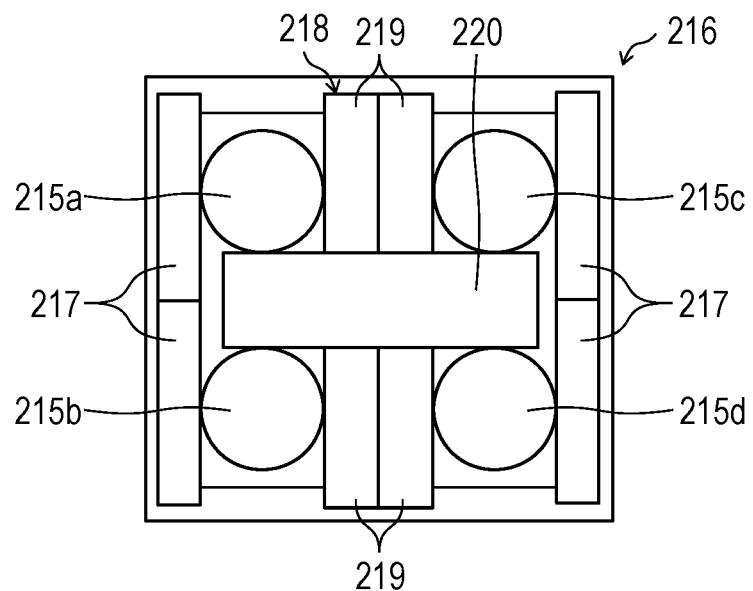
FIGS. 7A and 7B are top views each illustrating a detailed configuration of a light-receiving element array illustrated in FIG. 6.
Figure 7B:
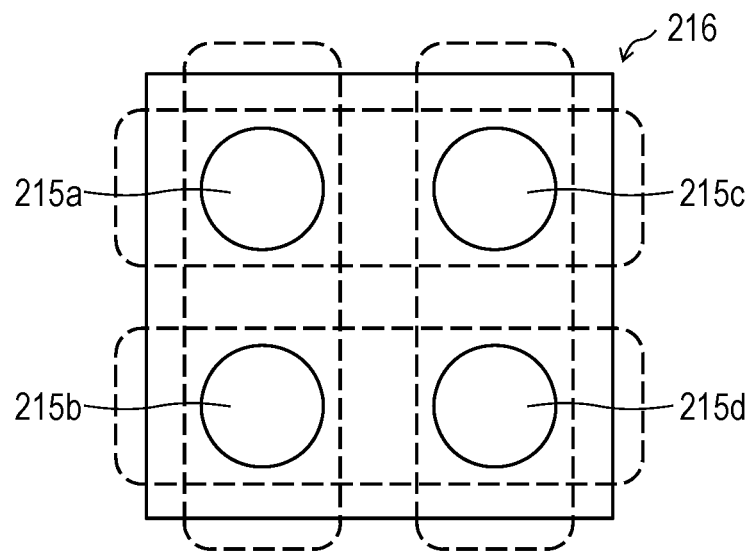

FIGS. 7A and 7B are top views each illustrating a detailed configuration of the light-receiving element array 214 of FIG. 6. In the light-receiving element array 214, a unit that includes at least four light-receiving elements 215 and front end circuits functions as a unit element 216 for the TOF signal processing. The unit element 216 includes at least four light-receiving elements 215a to 215d, front end circuits 217 each connected to a corresponding one of the light-receiving elements 215a to 215d, and a moving-direction estimator unit 218. An output of each of the front end circuits 217 is subjected to an OR operation inside the selector 27 and then input to the TOF signal processing unit 24.

That is, in the light-receiving element array 214, the four light-receiving elements 215a to 215d are allocated to one subspace as, but are bundled to function as the one unit element 216 for the TOF signal processing. However, as described in detail below, an output of each of the four light-receiving elements 215a to 215d is independently input to the moving-direction estimator unit 218 via the corresponding one of the front end circuits 217 in order to estimate a moving direction of a target.

Also in the TOF ranging sensor 12, similarly to the case of Embodiment 1, the light emitting lens system 202 of the light-emitting unit 200 and the light receiving lens system 212 of the light-receiving unit 210 are cooperatively designed with the light-emitting element array 204 and the light-receiving element array 214 so that there is no dead region and 72° that is a general field angle of a mobile camera is satisfied. Accordingly, for the TOF ranging sensor 12, angular resolution of each of the subspaces ds that form the first subspace group $dsg_1$ that is able to be designated from the host system 1 is about 1° as to both of the light-emitting unit 200 and the light-receiving unit 210, the same as Embodiment 1.

A size of each of the light-receiving elements 215a to 215d is smaller than that of each of the light-receiving elements 213 of the light-receiving element array 211 described in Embodiment 1, so that a proportion of an area of an invalid region relatively increases. Thus, even when an area of the entire light-receiving element array 214 is the same, there is a possibility that photosensitivity is reduced in total. Also in this case, as described above, by densely forming micro lenses so as to cover the entire light-receiving element array 214, it is possible to improve the problem of reduction in photosensitivity.

Additionally, a reception circuit of the TOF ranging sensor 12 according to the present embodiment is configured to be able to simultaneously perform parallel processing of TOF signals of 36 channels and output 36 pieces of ranging data in one measurement cycle. The number of parallel processing is much smaller than the number of array pixels similarly to Embodiment 1, so that it is possible to greatly reduce power consumption on a light emission side. Similarly to the case described in Embodiment 1 with use of FIGS. 3A to 3E, by causing the TOF ranging sensor 12 to operate after designating the operation mode to form the first subspace group $dsg_1$, it is possible to greatly reduce total power consumption of the TOF ranging sensor 12, which is consumed mainly on the light emission (light-emitting unit 200) side, by at least one digit, compared with a three-dimensional camera system of a conventional method such as a stereo camera or a structure light method.

(Operation of TOF Ranging Sensor)

Next, an operation of the TOF ranging sensor 12 will be described. Designation of each operation mode is not illustrated again in the present embodiment, but is able to be set, for example, as in examples below.

In the operation mode (a), the first subspace group $dsg_1$ corresponds to one subspace ds (that is, one unit element 216), and the number of first subspace groups $dsg_1$ is able to be simultaneously designated up to 36 at any positions in the entire field angle. An angle width formed by each of the first subspace groups $dsg_1$ is 1° which is the same as the minimum angular resolution. By performing the TOF signal processing of 1 channel for each of the 36 first subspace groups $dsg_1$, it is possible to acquire distance informations of 36 points in total (angular resolution of 1°).

In the operation mode (b), the first subspace group $dsg_1$ corresponds to 4 (2×2) subspaces ds (that is, 2×2 unit elements 216) arranged in an adjacent manner in a square form, and the number of first subspace groups $dsg_1$ is able to be simultaneously designated up to 9 at any positions in the entire field angle. An angle width of each of the first subspace groups $dsg_1$ is 2° which is twice as much as the minimum angular resolution. By performing the TOF signal processing of 4 channels in parallel for each of 9 first subspace groups $dsg_1$, it is possible to acquire distance informations of 4 points in each of the first subspace groups $dsg_1$, that is, 36 points in total (angular resolution of 1°).

In the operation mode (c), the first subspace group $dsg_1$ corresponds to 9 subspaces ds (that is, 3×3 unit elements 216) arranged in an adjacent manner in a square form, and the number of first subspace groups $dsg_1$ is able to be simultaneously designated up to 4 at any positions in the entire field angle. An angle width of each of the first subspace groups $dsg_1$ is 3° which is three times as much as the minimum angular resolution. By performing the TOF signal processing of 9 channels in parallel for each of the 4 first subspace groups $dsg_1$, it is possible to acquire distance informations of 36 points in total (angular resolution of 1°).

In the operation mode (d), in the first subspace group $dsg_1$, second subspace groups $dsg_2$ in which transmission/reception signals in a region corresponding to 16 (4×4) subspaces ds (that is, 4×4 unit elements 216) arranged in an adjacent manner in a square form are combined into one channel by an OR operation are further defined. At any positions in the entire field angle, 36 second subspace groups $dsg_2$ are able to be designated. For example, when the first subspace group $dsg_1$ that includes 36 (6×6) second subspace groups $dsg_2$ arranged in the adjacent manner in a square form is defined, one first subspace group $dsg_1$ is able to be designated at any position in the entire field angle. An angle width of each of the second subspace groups $dsg_2$ is 24° which is obtained from the minimum angular resolution×4×6. By performing the TOF signal processing of 1 channel for each of the 36 second subspace groups $dsg_2$, it is possible to acquire distance values of 36 points in total (angular resolution of 4°).

In the operation mode (e), in the first subspace group $dsg_1$, second subspace groups $dsg_2$ in which transmission/reception signals in a region corresponding to 144 (12×12) subspaces ds (that is, 12×12 unit elements 216) arranged in an adjacent manner in a square form are combined into one channel by an OR operation are further defined. An angle width of each of the second subspace groups $dsg_2$ is 12° which is 12 times as much as the minimum angular resolution. When the first subspace group $dsg_1$ that is constituted by 36 (6×6) second subspace groups $dsg_2$ arranged in the adjacent manner in a square form is defined, the entire field angle is covered, so that it is not necessary to designate positions of the second subspace groups $dsg_2$. By performing the TOF signal processing of 1 channel for each of the 36 second subspace groups $dsg_2$, it is possible to acquire distance informations of 36 points in total (angular resolution of 12°).

In this manner, in each of the operation modes (a) to (c), distance informations of a plurality of objects (targets) the number of which is up to 36 is able to be simultaneously captured at a frame rate of the RGB camera module 3. By appropriately selecting a size and the position of the first subspace group $dsg_1$, it is possible to continuously acquire data useful for object tracking.

On the other hand, in the operation mode (d), it is possible to generate a depth map of the angular resolution of 4° and 6×6=36 channels at the frame rate of the RGB camera module 3 for a specific region (in the example, a square region of 24°×24° at any position). For example, when an object is extracted from a camera image (image information), it is possible to acquire, with high accuracy, distance information that is useful in image analysis of a specific region in which a plurality of targets exist locally and intricately.

In the operation mode (e), by roughing the angular resolution to 12°, it is possible to cope with multi points that an entirety of the field angle of 72° is divided into 6×6=36 squares and that is used for general high-speed AF. That is, the example is equivalent to acquire distance informations or 36 points by one TOF ranging sensor 12 while covering the entire field angle of the RGB camera module 3 as if 6×6=36 one-dimensional TOF sensors each having an entire viewing angle (whole width viewing angle) of 12° were virtually and densely arranged and operated in parallel.

Needless to say, the numerical values and details of the exemplified operation modes are not limited to the contents described above, and any derivative development is possible. What is important here is that, by designating the operation mode in advance from the side of the host system 1 with respect to the TOF ranging sensor 12 by serial communication or switching the operation mode immediately at any timing, desired distance information which changes depending on a situation is able to be acquired by using a tiny number of channels and a tiny number of emission beams, that is, extremely low power consumption of the TOF ranging sensor 12.

From the comparison of Embodiment 1 and Embodiment 2, it is understood that the number of channels and the number of pixels of each array element have a trade-off relationship with the power consumption, the angular resolution, and the field angle of the TOF ranging sensor 12, but, similarly to Embodiment 1, the TOF ranging sensor 12 is able to reduce total power consumption of the TOF ranging sensor 12, which is consumed mainly on the light emission (light-emitting unit 200) side, by two or three digits compared with a conventional technique having accuracy (angular resolution) of an equivalent level, and to acquire depth information that is truly useful in application to a three-dimensional mapping for a mobile terminal without influencing a battery life of the terminal.

Next, a moving direction estimating operation of a target by the TOF ranging sensor 12 will be described. The moving-direction estimator unit 218 estimates a moving direction of a target on the basis of a temporal change in a light reception amount distribution when a reflected light beam $Lin_{(p, q)}$ (a reflection component of a laser light beam $Lout_{(p, q)}$, which is from the target exiting in a subspace $ds_{(p, q)}$, is incident on each of the light-receiving elements 215a to 215d constituting the unit element 216.

The moving-direction estimator unit 218 is arranged for each of the unit elements 216 one by one. All of the output signals of the front end circuits 217 included in the unit element 216 are input to the moving-direction estimator unit 218. The moving-direction estimator unit 218 includes at least four counter circuits 219 each connected to a corresponding one of the light-receiving elements 215a to 215d and a logic circuit 220, and operates in accordance with a TOF measurement cycle as follows.

First, the counter circuits 219 count the number of pulses included in the output signals of front end circuits 217 of the unit element 216 during a specific period including at least a TOF measurement sequence of a measurement cycle, after being reset at a head of the measurement cycle or an end of a measurement cycle immediately before the measurement cycle. Thereby, the counter circuits 219 acquire a light amount value that corresponds to a received light amount of the light-receiving elements 215a to 215d for each measurement cycle. The logic circuit 220 stores each light amount value in a memory element such as a register or an SRAM so as to compare changes in light amount values every measurement cycle. Note that, the memory element may be included in the logic circuit 220.

Next, the logic circuit 220 estimates a moving direction of a target by comparing light amount values of successive two measurement cycles.

Here, when the counter circuits 219 count dark count (state under only environment light, in which the light-emitting unit 200 itself does not emit light at all) of the light-receiving elements 215a to 215d separately from the light amount value (counted value) corresponding to the received light amount distribution of the light-receiving elements 215a to 215d and the logic circuit 220 subtracts the dark count from the light amount value, influence of disturbance light is able to be reduced.

Additionally, the logic circuit 220 may take the sum of count values of output signals of the front end circuits 217 for four directions of up and down and right and left of the unit element 216 or six directions additionally including oblique directions of 45° so that the received light amount of each of the light-receiving elements 215a to 215d temporally changes and directions in which images of targets move are easily estimated and so that an individual difference of dark count between the light-receiving elements 215a to 215d is easily absorbed, and may store the light amount values in the memory element such as the register or the SRAM so as to be able to perform comparison with a result of a subsequent measurement cycle. Thereby, the moving-direction estimator unit 218 is able to estimate a direction in which the received light amount of each of the light-receiving elements 215a to 215d increases, that is, directions in which the images of the targets move for the four directions of up and down and right and left of the unit element 216 or six directions additionally including the oblique directions of 45°. Note that, size comparison by a plurality of digital comparators is required to be performed in the logic circuit 220 for actual estimation. Though depending on a node of a wafer process to be used, it is sufficiently possible to mount such a logic circuit 220 on each of the unit elements 216.

(Effect of TOF Ranging Sensor)

According to the configuration exemplified in the present embodiment, it is possible to greatly easily realize combination of moving direction estimation described above and reliability (determination of presence or absence of an information target) of distance information, which has been described in detail in Embodiment 1. In other words, whether or not a target exists in the first subspace group $dsg_1$ designated by the host system 1 in advance is determined on the basis of a result of the TOF signal processing for the unit element 216 in which the light-receiving elements 215a to 215d are bundled and compared with a result obtained by directly counting outputs of the light-receiving elements 215a to 215d to thereby estimate a direction in which a position of the target temporally changes. On the basis of a result of the estimation, the TOF ranging sensor 12 itself is able to control, via the space control unit 22, signal connection to the light-emitting element array 204 and signal connection from the light-receiving element array 214, designate a position and a moving amount of the first subspace group $dsg_1$ that is to be formed, and continue a TOF ranging operation while automatically supplementing the target. In this manner, it is possible to two-dimensionally divide a three-dimensional space in an angle region and, when distance information is obtained in each region, automatically update the two-dimensional angle region in which distance information is actually to be acquired, so that the TOF ranging sensor 12 is able to greatly reduce total power consumption of the TOF ranging sensor 12, which is consumed mainly on the light emission (light-emitting unit 200) side, compared with a conventional technique and also to acquire truly useful three-dimensional depth information without giving an excessive load of image signal processing to the host system 1.

In this manner, it is possible to realize a two-dimensional tracking operation that is greatly useful for practical use from viewpoints of operability and power consumption, in which the TOF signal processing including determination of presence or absence of a target is performed once for the first subspace group $dsg_1$ designated in advance on the basis of a result of image analysis of the host system 1 and thereafter, only for a necessary first subspace group $dsg_1$, the TOF ranging sensor 12 itself automatically supplements the target and continues the TOF signal processing. Alternatively, instead of designating the first subspace group $dsg_1$ by the side of the host system 1, the TOF ranging sensor 12 itself is able to execute, similarly to the above, complete two-dimensional tracking TOF ranging of automatically supplementing a target by, prior to a continuous operation, dividing the entire field angle, performing scanning, and determining a subspace in which the target exits.

[Conclusion]

The ranging sensor (TOF ranging sensor 2, 12) according to an aspect 1 of the disclosure is a ranging sensor of a TOF method, which operates in cooperation with at least one camera module (RGB camera module 3), measures time during which a beam (light beam Lout) radiated to a space is reflected by a target and returned, and generates distance information of the target for generating three-dimensional positional information by combining the distance information with image information acquired by the camera module, and the ranging sensor includes: a light-emitting unit that includes a plurality of light-emitting elements arranged in plane and radiates, toward subspaces obtained by dividing the space, light from of the light-emitting elements, which are allocated to the subspaces, with the light formed into a beam by a light emitting lens system; a light-receiving unit that includes a plurality of light-receiving elements arranged in plane, and receives reflected light beams from the subspaces and forms images of the reflected light beams on the light-receiving elements, which are allocated to the subspaces, by a light receiving lens system; and a space control unit that independently controls each element group that includes at least one light-emitting element and at least one light-receiving element that are allocated to a common one of the subspaces.

According to the aforementioned configuration, since the TOF ranging sensor is able to independently control each element group including the light-emitting element and the light-receiving element each of which is allocated to the subspace ds, it is possible to efficiently operate the TOF ranging sensor by selectively driving only a minimum number of element groups. Additionally, there is no need to provide a MEMS mirror or the like as conventional, so that it is possible to achieve simplification of a device configuration while keeping spatial resolution with high ranging accuracy, and to thereby facilitate reduction in a size and costs.

The ranging sensor according to an aspect 2 of the disclosure may further include, in the aspect 1, a TOF signal processing unit having TOF signal processing channel whose number is less than that of the light-emitting elements included in the light-emitting unit and performing TOF signal processing in parallel to acquire distance informations, and the number of the distance informations may be equal to or less than the number of the TOF signal processing channels.

According to the aforementioned configuration, since the TOF signal processing unit performs the TOF signal processing in parallel in TOF signal processing channels whose number is less than that of the light-emitting elements included in the light-emitting unit, it is possible to reduce total power consumption of the TOF ranging sensor, which is consumed mainly on a light emission (light-emitting unit) side.

In the ranging sensor according to an aspect 3 of the disclosure, in the aspect 2, the space control unit may configure at least one or a plurality of subspace groups (first subspace group $dsg_1$, second subspace group $dsg_2$) that is/are designated in advance on a basis of the image information and each of the subspace groups may include one or a plurality of the subspaces, and the distance informations related to the subspace groups may be acquired in the TOF signal processing unit.

According to the aforementioned configuration, by an operation in cooperation with the camera module, it is possible to selectively acquire distance information related to a necessary subspace group designated in advance on the basis of the image information acquired by the camera module.

In the ranging sensor according to an aspect 4 of the disclosure, in the aspect 3, the TOF signal processing unit may add, to the distance informations, further information indicating reliability for each of the distance informations related to the specific subspaces or subspace groups.

According to the aforementioned configuration, it is possible to suppress generation of three-dimensional positional information using distance information with low reliability.

In the ranging sensor according to an aspect 5 of the disclosure, in the aspect 3 or 4, the number of the light-receiving elements included in the light-receiving unit may be a multiple of the number of the light-emitting elements included in the light-emitting unit, the light-receiving elements may be configured to form a unit element in a unit of the multiple, and a moving-direction estimator unit that estimates a set of moving directions of targets, on a basis of change in a light amount reflected by each of the targets and received by the light-receiving elements in each of unit elements, may be further included.

According to the aforementioned configuration, it is possible to efficiently operate the ranging sensor by selectively driving only a minimum number of element groups on the basis of the moving directions of the targets.

In the ranging sensor according to an aspect 6 of the disclosure, in the aspect 5, the space control unit may reconfigure the subspace groups on a basis of a result of the estimation of the moving-direction estimator unit, and the distance informations related to the reconfigured subspace groups may be acquired in the TOF signal processing unit.

According to the aforementioned configuration, since the ranging sensor is able to acquire distance informations of the targets while continuously supplementing the target, it is possible to acquire useful distance informations on a side of the ranging sensor without giving an excessive load of image signal processing to a host system of a device on which the ranging sensor is mounted.

In the ranging sensor according to an aspect 7 of the disclosure, in the aspects 1 to 6, the number of the light-emitting elements and the number of the light-receiving elements may be equal to or less than the number of effective pixels of an imaging sensor that is included in the camera module.

According to the aforementioned configuration, it is possible to efficiently reduce total power consumption of the TOF ranging sensor.

The disclosure is not limited to each of the embodiments described above, and may be modified in various manners within the scope of the claims, and an embodiment achieved by appropriately combining technical means disclosed in each of different embodiments is also encompassed in the technical scope of the disclosure. Further, by combining the technical means disclosed in each of different embodiments, a new technical feature may be formed.

The present disclosure contains subject matter related to that disclosed in Japanese Priority Patent Application JP 2017-184002 filed in the Japan Patent Office on Sep. 25, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A ranging sensor of a TOF method, which operates in cooperation with at least one camera module, measures time during which a beam radiated to a space is reflected by a target and returned, and generates distance information of the target for generating three-dimensional positional information by combining the distance information with image information acquired by the camera module, the ranging sensor comprising:
 a light-emitting unit that includes a plurality of light-emitting elements arranged in plane and radiates, toward subspaces obtained by dividing the space, light from the light-emitting elements, which are allocated to the subspaces, with the light formed into a beam by a light emitting lens system;
 a light-receiving unit that includes a plurality of light-receiving elements arranged in plane, and receives reflected light beams from the subspaces and forms images of the reflected light beams on the light-receiving elements, which are allocated to the subspaces, by a light receiving lens system;

a space control unit that independently controls each element group that includes at least one light-emitting element and at least one light-receiving element that are allocated to a common one of the subspaces, wherein the space control unit configures at least one or a plurality of subspace groups that is/are designated in advance on a basis of the image information and each of the subspace groups includes a plurality of the subspaces arranged in an adjacent manner in a square form, the distance informations related to the subspace groups are acquired, and a number of the light-receiving elements included in the light-receiving unit is a multiple of a number of the light-emitting elements included in the light-emitting unit, the number of the light-receiving elements being greater than the number of the light-emitting elements.

2. The ranging sensor according to claim 1, further comprising a TOF signal processing unit having TOF signal processing channels whose number is less than a number of the light-emitting elements included in the light-emitting unit and performing TOF signal processing in parallel to acquire the distance informations, wherein a number of the distance informations is equal to or less than the number of the TOF signal processing channels.

3. The ranging sensor according to claim 2, wherein the TOF signal processing unit adds, to the distance informations, further information indicating reliability for each of the distance informations related to specific subspaces or subspace groups.

4. The ranging sensor according to claim 2, wherein the light-receiving elements are configured to form a unit element in a unit of the multiple, and a moving-direction estimator unit that estimates a set of moving directions of targets, on a basis of change in a light amount reflected by each of the targets and received by the light-receiving elements in each of unit elements, is further included.

5. The ranging sensor according to claim 3, wherein the light-receiving elements are configured to form a unit element in a unit of the multiple, and a moving-direction estimator unit that estimates a set of moving directions of targets, on a basis of change in a light amount reflected by each of the targets and received by the light-receiving elements in each of unit elements, is further included.

6. The ranging sensor according to claim 4, wherein the space control unit reconfigures the subspace groups on a basis of a result of the estimation of the moving-direction estimator unit, and the distance informations related to the reconfigured subspace groups are acquired in the TOF signal processing unit.

7. The ranging sensor according to claim 5, wherein the space control unit reconfigures the subspace groups on a basis of a result of the estimation of the moving-direction estimator unit, and the distance informations related to the reconfigured subspace groups are acquired in the TOF signal processing unit.

8. The ranging sensor according to claim 1, wherein the number of the light-emitting elements and the number of the light-receiving elements are equal to or less than the number of effective pixels of an imaging sensor included in the camera module.

* * * * *